Figure 1:
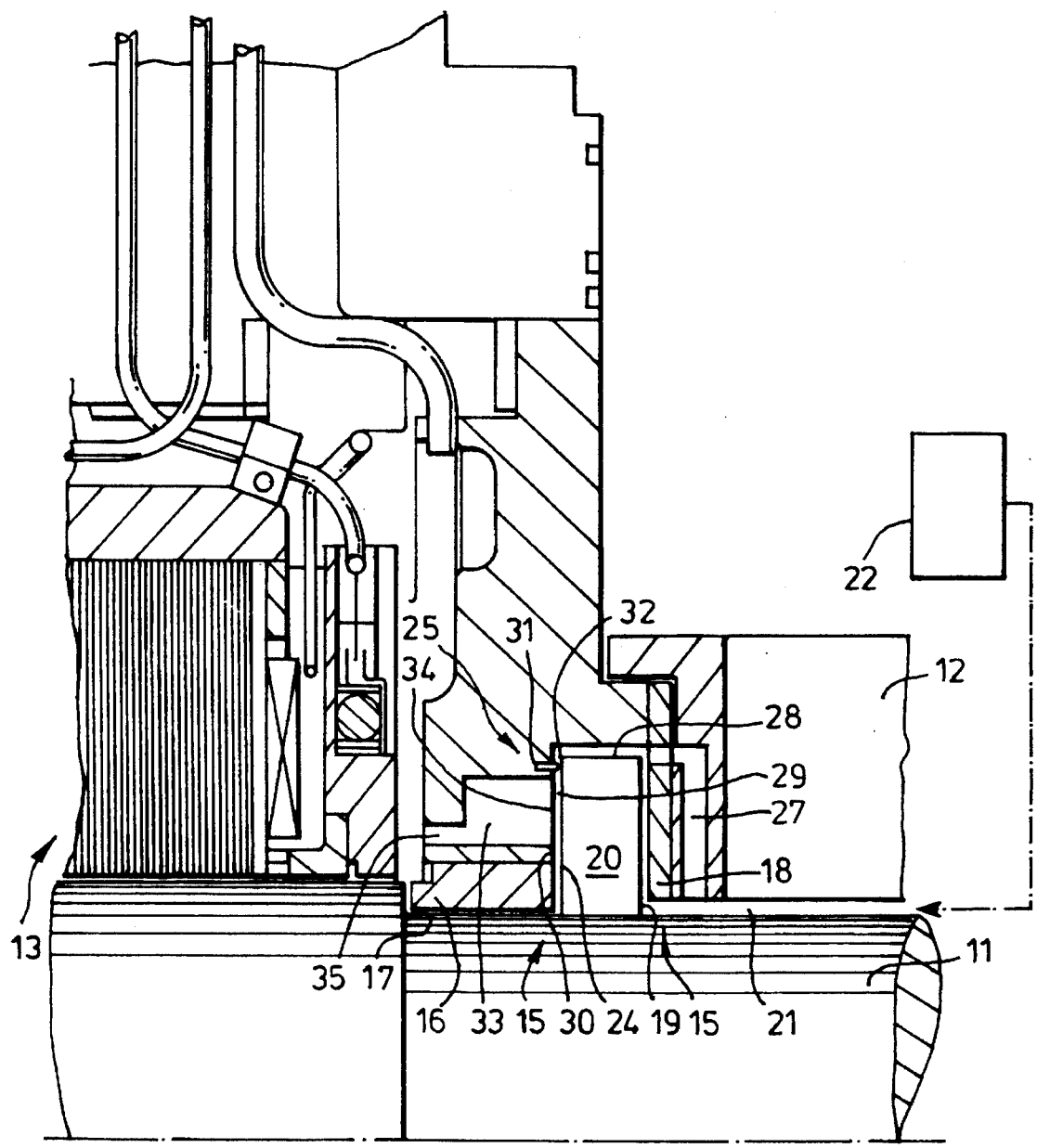

United States Patent [19]

Shultz

[11] Patent Number: 5,548,170

[45] Date of Patent: Aug. 20, 1996

[54] VIBRATION DAMPING ARRANGEMENT

[75] Inventor: Richard R. Shultz, Groton, Conn.

[73] Assignee: Glacier RPB Inc., Mystic, Conn.

[21] Appl. No.: 274,432

[22] Filed: Jul. 13, 1994

[51] Int. Cl.⁶ .............................. H02K 7/09; F16C 32/06
[52] U.S. Cl. ............................................. 310/90.5; 384/121
[58] Field of Search ............................. 310/51, 90, 90.5;
384/100, 107, 121

[56] References Cited

U.S. PATENT DOCUMENTS

| | | | |
|---|---|---|---|
| 3,490,819 | 1/1970 | Greenberg | 384/107 |
| 3,563,618 | 2/1971 | Ivanov | 384/121 |
| 3,582,159 | 6/1971 | Uhtenwoldt | 384/100 |
| 3,891,283 | 6/1975 | Pruvot | 384/100 |
| 3,895,689 | 7/1975 | Swearingen | 384/121 |
| 3,989,316 | 11/1976 | Woodruff | 384/107 |
| 3,998,502 | 12/1976 | Walter et al. | 384/107 |
| 4,227,865 | 10/1980 | Erickson et al. | 417/365 |
| 4,306,754 | 12/1981 | Kraus | 384/121 |
| 4,396,302 | 8/1983 | Drevet et al. | 384/121 |
| 4,726,692 | 2/1988 | Jansing et al. | 384/107 |
| 5,209,652 | 5/1993 | Fischer et al. | 384/121 |
| 5,382,095 | 1/1995 | Akutsu | 384/100 |

FOREIGN PATENT DOCUMENTS

WO81/01449  5/1981  WIPO ..................... 384/100

*Primary Examiner*—Clayton E. LaBalle
*Attorney, Agent, or Firm*—Nixon & Vanderhye P.C.

[57] ABSTRACT

A damping arrangement 25 (FIG. 1) for damping axial vibrations in a shaft suspended (optionally) by a magnetic bearing has a radially extending thrust face 24 mounted on the shaft and separated by a small face gap 29 from a housing 30 and through which gap a stream of gas is forced by way of a flow restrictor 31 at the entrance to the gap. The flow restrictor acts with thrust face 26 to define a gap entrance related to the axial position/displacement of the shaft. A chamber 33, defined downstream of the restrictor and having exhaust passage 35, opens at neck 34 to face the thrust face and the gas pressure therein exerts axial thrust on the shaft. Axial vibration of the shaft modulates gas supply to the face gap and the chamber is dimensioned to create a phase lead of 90° for the instantaneous pressure therein and axial thrust on the shaft, thus damping the shaft vibrations causing its displacement.

15 Claims, 3 Drawing Sheets

VIBRATION DAMPING ARRANGEMENT

This invention relates to an axial vibration damping arrangement for a rotor shaft rotatable within a housing and maintained in position axially by a control system responsive to externally induced disturbances of the said axial position to apply restoring forces. Such a shaft having axial position control is frequently, but not exclusively, found in magnetic bearing arrangement in which the rotor shaft is suspended both radially and axially within electro magnetic fields controlled by said control system as a function of displacement from a desired position.

It is characteristic of such magnetic bearings that a very small suspension gap separates the shaft and appendages, rotating a very high speed, from stationary parts. To accommodate failure of the electromagnets or control circuits or inability of the control circuits to restore position, back-up bearing arrangements are employed which permit purposely positioned shaft surfaces on collars or the like to run in contact with stationary bearing materials, both to protect the electromagnetic components and to provide a rotational energy dissipating, that is, braking function for the shaft. It is furthermore known to provide cooling gas caused to flow across the bearing surfaces for extracting heat therefrom, which gas may also perform a sealing function for process gases associated with the machine of which the shaft is part.

Whereas the electromagnetic bearings and their control arrangements may be dimensioned and powered to suspend the shaft against continuous forces of any practicable magnitudes, they are less able to deal with cyclical variations in forces acting on the shaft, that is, vibrational reciprocation of the shaft, because of limited bandwidths of the control arrangements.

It has been found in installations wherein the externally applied or internally generated forces cause reciprocation of shaft position, particularly in axial direction, that a magnetic axial bearing may be overwhelmed without there being a fault in the magnetic bearing per se and the back-up bearing arrangement caused to operate unnecessarily and to the detriment of its longevity and efficiency of the magnetic bearing as a whole.

The need to provide damping for axial reciprocation of a shaft (or equivalent rotating body which the term 'shaft' used hereinafter is intended to include) due to externally induced forces is not limited to shafts suspended in a controlled magnetic bearing, and thus preserving the generality of the foregoing, it is an object of this invention to provide an axial thrust damping arrangement, for such a shaft, of simple construction.

It is also an object of the invention to provide a thrust damping arrangement which utilises cooling gas associated with a bearing arrangement of the shaft.

It is furthermore an object of the present invention to provide an axial damping arrangement which may be implemented with minimal modifications to structures existing for bearing functions and a minimum of additional components.

In accordance with this invention an axial vibration damping arrangement for a rotor shaft rotatable within a housing comprises at least one radially extending thrust face fixed with respect to the rotor shaft and facing along the axis of the shaft, a gas supply arranged to feed gas to impinge upon said thrust face and flow in a radial direction along a face gap between said thrust face and the housing said face gap including adjacent the upstream entrance thereto a gas flow restrictor extending in a direction between the housing and thrust face, whereby the area of the gap entrance is a function of the axial position of the thrust face and shaft with respect to the housing, and, downstream of said gas flow restrictor, (a) chamber means, comprising at least one chamber, opening at a chamber neck into said face gap adjacent the thrust face and (b) exhaust passage means, comprising at least one passage, having a cross-section greater than the maximum area of gap entrance at the gas flow restrictor, extending from the chamber means to downstream of the face gap, said gas supply being arranged to feed gas at such rate as to create a positive pressure within the chamber means to exert an axial thrust on the thrust face related to the neck area of the chamber means, said gap entrance being varied by axial vibrational reciprocation of the thrust face, induced by disturbances of the shaft, to create a variation in said positive pressure within the chamber means advanced in phase with respect to the variation of shaft position within a predetermined frequency range to effect a corresponding variation in axial thrust on said thrust face to effect damping of the shaft reciprocation.

Figure 2:
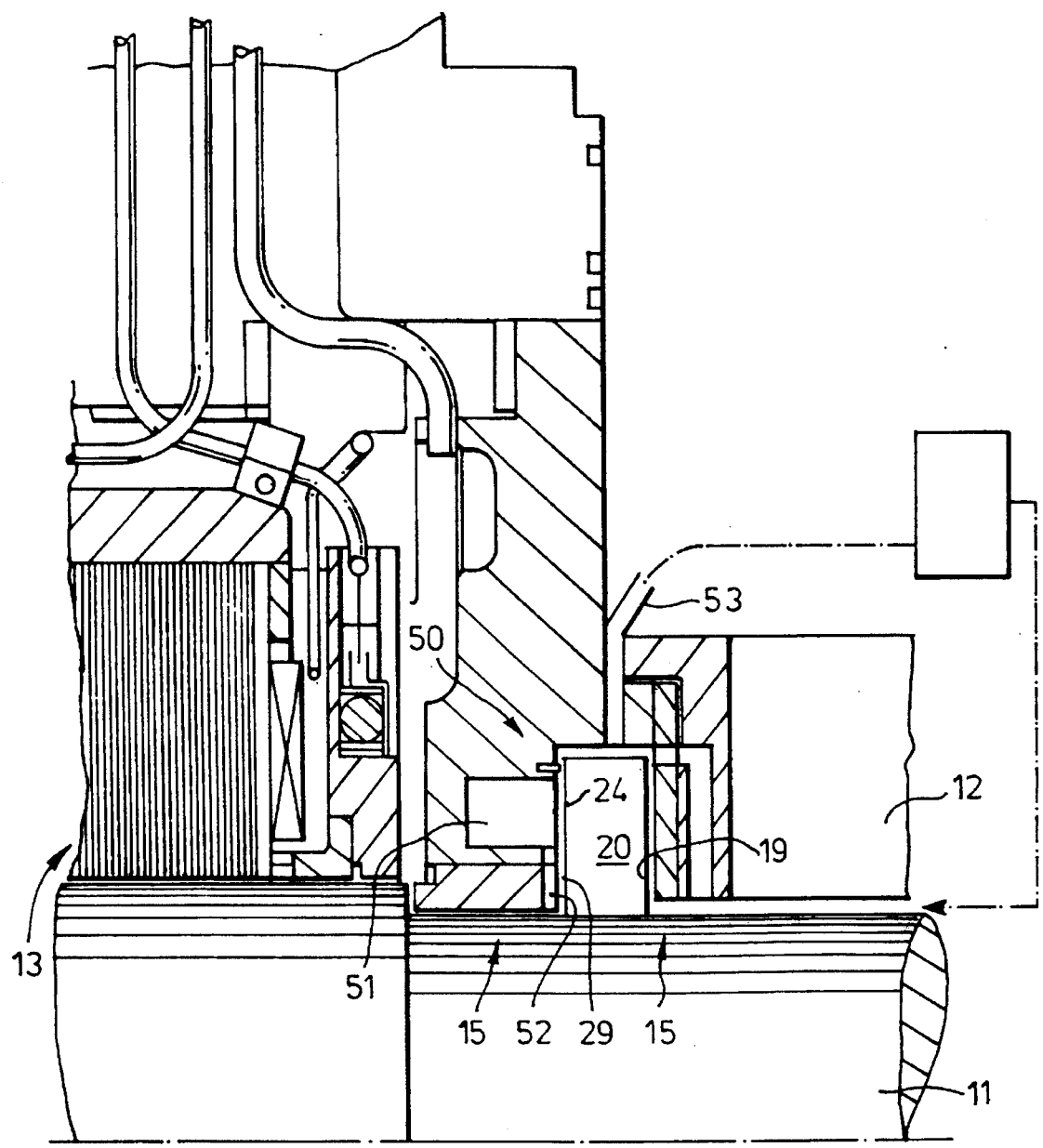
Figure 3:
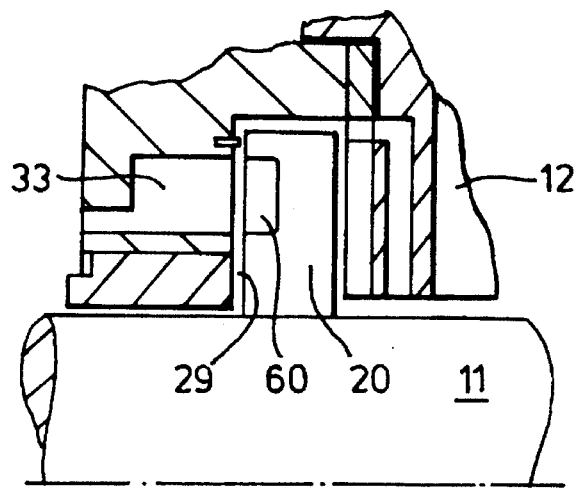
Figure 5:
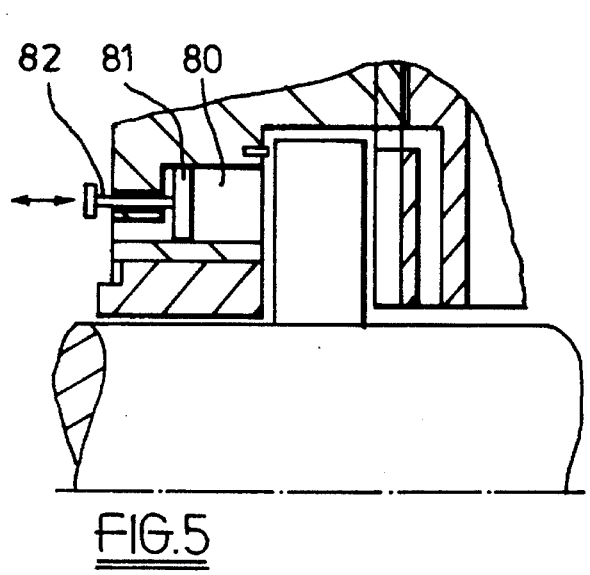
Figure 4:
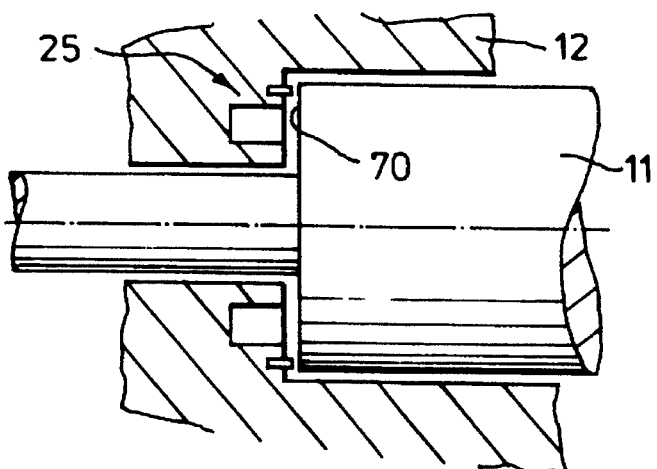

The invention will now be described with reference to the accompanying drawing, in which:

FIG. 1 is a sectional elevation through a portion of a housing and shaft contained therein supported axially by an electromagnetic thrust bearing and back-up bearing arrangement and including a first form of axial damping arrangement in accordance with the present invention, FIG. 2 is a sectional elevation, similar to FIG. 1 but showing a second form of axial damping arrangement in accordance with the invention, FIG. 3 is a schematic sectional elevation of a suspended shaft showing a third form of axial damping arrangement in accordance with the invention, in which the chamber means is formed in a rotatable part, FIG. 4 is a schematic sectional elevation of a suspended shaft showing a fourth form of axial damping arrangement in which thrust face is of a different form, and FIG. 5 is a schematic sectional elevation of a suspended shaft showing a fifth form of axial damping arrangement in which the chamber means is adjustable.

Referring to FIG. 1 a rotor shaft 11 is suspended within a housing 12 by electromagnetic bearing means, part of which is shown at 13. To accommodate failure of the electromagnetic bearings to support the shaft a back-up bearing arrangement is provided shown generally at 15.

The back-up bearing arrangement includes a cylindrical block 16 of dry running bearing material extending about the shaft to provide radial back-up for a portion 17 of the shaft itself and a flat annular block 18 of similar dry running bearing material to provide axial back-up for a face 19 of a collar 20 secured to the shaft.

An annular clearance 21 exists between the shaft and housing and source 22 provides a supply of cooling gas by way of the clearance 21 to flow across the contact-making faces of the collar 20 and bearing material 18 and between the shaft portion 17 and bearing material 16. In this construction the axial back-up bearing 18, 19 provides support for the shaft against excessive displacement in a single axial direction and the opposite radially extending face 24 of the collar 20 is unused. A similar back-up bearing arrangement (not shown) spaced axially along the shaft provides support for the shaft against excessive axial displacement in the opposite direction.

In accordance with the invention an axial thrust damping arrangement is provided as shown generally at 25.

It comprises a radially extending thrust face provided by the face 24 of collar 20 that is facing along the shaft and a gas supply, provided by the cooling gas passing along clearance 21 and passages 27 in the housing which causes some of the gas to by-pass the back-up bearing arrangement and pass, like the used cooling gas but at increased pressure and flow rate, across the periphery 28 of collar 20 and in a radial direction along a face gap 29 defined between the thrust face 24 and the housing at 30 which overlies it radially.

The face gap 29 includes, adjacent the upstream entrance thereto, a gas flow restrictor 31 which extends in a direction between the housing and the thrust face 24. The flow restrictor 31, which also extends about the periphery of the shaft, is conveniently mounted on, or formed integrally with, the housing but may be carried by, or formed of the collar thrust face 24. It will be appreciated that the flow restrictor 31 defines with the thrust face 24 a gap entrance 32 to the face gap 29 whose area is a function of the axial position of the thrust face and shaft with respect to the housing.

Downstream of the flow restrictor 31 there is provided chamber means 33 comprising at least one chamber, such as the annular chamber shown which extends completely about the shaft. The chamber means, that is, each chamber thereof, opens at a chamber neck 34 into the face gap 29 adjacent the collar thrust face. The chamber is of substantially uniform cross-section in an axial direction and the chamber neck of substantially identical cross-sectional area with the remainder of the chamber.

Exhaust passage means 35 extends from the chamber through the housing from a wall 36 of the bearing disposed opposite to the chamber neck, to a point 37 downstream of the chamber gap, the exhaust passage having a cross-sectional area greater than the maximum area of gap entrance 32 at the gas flow restrictor.

The dimensions of the chamber means, gap entrance and exhaust passage and rate and pressure of gas supply are chosen having regard to achieving a functional result to be described.

The gas is supplied upstream of the flow restrictor and flows therethrough and through the face gap to exit by way of clearance between the radial back-up bearing 16, 17 where it may provide a cooling function. Some of the gas flows into, and through, the chamber means 33, exiting by way of exhaust passage 35.

The gas is arranged to feed into the face gap at such a rate as to create a positive pressure in the chamber means 33, notwithstanding the flow of gas therefrom by way of exhaust passage 35. The positive pressure within the chamber means exerts and axial thrust on the collar thrust face 24 which is related not only to instantaneous chamber pressure but also the chamber neck area.

In operation, when the shaft is subjected to consistent externally induced axial force, the chamber provides a substantially constant axial thrust on the collar. When the shaft is subjected to a axial vibration that results in reciprocation of its desired axial position, the variations in entrance gap at the flow restrictor modulates the flow of gas into the face gap and chamber means and thus the pressure in the latter, the consequence being a modulation in axial thrust on the thrust face out of phase with the forced reciprocation of the shaft and collar.

The location of the chamber means causes the modulation in axial thrust, due to instantaneous pressure in the chamber means, to be advanced in phase with respect to the shaft reciprocation and thus acts towards damping such reciprocation.

By dimensioning the chamber in accordance with standard equations known (for example, from the book entitled "Compressible Fluid Flow" by Shapiro, Ascher H, published by the Ronald Press Co, 1950/1955) and widely use in compressible fluid theory, it is possible to tune the response to a particular vibration frequency band to effect a phase advance of pressure variations in the chamber which lead shaft displacements due to the vibrational forces by 90° and exerts an optimum damping effect on the shaft reciprocation.

It will be appreciated that the 90° phase advance is optimum and achieved for a particular chamber size for a limited range of reciprocation frequencies. Some adjustment of frequency can be accommodated by changes in gas supply rate but significant changes are determined by the dimensions of the chamber means.

However, a useful degree of damping is provided for chamber pressure phase advances between 45° and 135° so that a practicable bandwidth for damping is readily achievable in practice.

It will be appreciated that many items described above may be varied without substantially altering the function.

Referring now to FIG. 2, a similar arrangement of shaft and housing is shown in which identical parts are given corresponding reference numbers but the axial thrust damping arrangement shown generally at 50 has the chamber means 51 provided with an exhaust passage 52 defined as a recess in the housing open to, and extending radially of, the face gap 29.

A further variation that is shown in FIG. 2 is the supply of gas by way of a separate supply duct 53 through the housing which may be employed instead of axially flowing cooling gas or when the latter is omitted.

It will be appreciated that the gas damping arrangements 25 and 50 may be employed as shown and described separately from a back-up bearing arrangement 18 and the absence of such back-up bearing arrangement increases the possibility for structural variations.

It will be appreciated that the gas may be supplied so that it flows across the thrust face in a radially outward direction, in which case the upstream flow restrictor would be located adjacent the shaft.

Furthermore, absent a back-up bearing arrangement, the face gap may be formed by either or both faces of collar 19.

It will be appreciated that if desired the chamber means may be formed as a series of discrete chambers, each with their own exhaust passage arrayed about the periphery of the shaft.

Furthermore, a chamber or chambers of the chamber means may be formed entirely or partly by recesses in the thrust faces of the collar 20 as illustrated schematically at 60 in FIG. 3.

It will be appreciated that where a single thrust face is employed at any one shaft location an axial thrust damping arrangement per se may have a thrust face provided, for example as illustrated in FIG. 4, by a simple shoulder 70 intermediate two shaft portions of different diameters.

Other variations are possible to vary the centre frequency of the band in which a useful phase advance is achieved; for instance, as illustrated in FIG. 5, the dimensions of the chamber means 80 may be altered by providing that at least one wall 81 of one or more chambers of the means is adjustable in position by means of adjusting screw or push rod 82. Alternatively, any other wall or walls of the chamber means may be adjustable in position or the chamber volume altered by means of a tuning screw or stub corresponding to the adjusting screw or push rod 82.

It will be appreciated that the above described axial damping arrangement may be employed with a shaft supported by conventional contact-making bearings if such a shaft is capable of making limited axial displacements and control of axial vibration is necessary, and irrespective of whether or not it is subject to active axial positional control.

Other changes may be made without departing from the scope of the invention.

I claim:

1. An axial thrust vibration damping arrangement for a rotor shaft rotatable within a housing, said damping arrangement comprising at least one radially extending thrust face fixed with respect to the rotor shaft and facing along the axis of the shaft, a gas supply arranged to feed gas to impinge upon said thrust face and flow in a radial direction along a face gap between said thrust face and the housing, said face gap including adjacent the upstream entrance thereto a gas flow restrictor extending between the housing and thrust face, whereby the area of the gap entrance is a function of the axial position of the thrust face and shaft with respect to the housing, and, downstream of said gas flow restrictor, (a) chamber means, comprising at least one chamber, opening at a chamber neck into said face gap adjacent the thrust face and (b) exhaust passage means, comprising at least one passage, having a cross-section greater than the maximum area of gap entrance at the gas flow restrictor, extending from the chamber means to downstream of the face gap, said gas supply being arranged to feed gas at such rate as to create a positive pressure within the chamber means to exert an axial thrust on the thrust face related to the neck area of the chamber means, said gap entrance being varied by axial vibrational reciprocation of the thrust face, induced by disturbances of the shaft, to create a variation in said positive pressure within the chamber means advanced in phase with respect to the variation of shaft position within a predetermined frequency range to effect a corresponding variation in axial thrust on said thrust face to effect damping of the shaft reciprocation.

2. A damping arrangement as claimed in claim 1 in which the shaft is suspended with respect to the housing with a suspension gap therebetween and said gas supply is arranged to feed gas to the thrust face along the suspension gap between shaft and housing.

3. A damping arrangement as claimed in claim 1 in which said gas flow restrictor is defined at a radially outer part of the thrust face and the chamber means radially inwardly thereof.

4. A damping arrangement as claimed in claim 1 in which the chamber means comprises an annular chamber extending continuously about the shaft.

5. A damping arrangement as claimed in claim 1 in which each chamber of the chamber means has a chamber neck of substantially identical cross-sectional area with the remainder of the chamber.

6. A damping arrangement as claimed in claim 1 in which each chamber of the chamber means is formed in the housing.

7. A damping arrangement as claimed in claim 6 in which exhaust passage means comprises for each chamber a passage extending through the housing from a wall thereof disposed opposite to the chamber neck.

8. A damping arrangement as claimed in claim 6 in which the exhaust passage means comprises for each chamber a recess in the housing open to, and extending radially of, the face gap.

9. A damping arrangement as claimed in claim 1 in which the thrust face is defined by a collar mounted on the shaft.

10. A damping arrangement as claimed in claim 1 in which the chamber means is dimensioned to provide a phase advance within the range of 45° to 135°.

11. A damping arrangement as claimed in claim 10 in which the chamber means is dimensioned to provide a phase advance of substantially 90°.

12. A damping arrangement as claimed in claim 1 including means to vary the volume of the chamber means.

13. A damping arrangement as claimed in claim 12 including means to vary at least one dimension of the chamber means.

14. A damping arrangement as claimed in claim 1 in which said gas supply is arranged to vary the gas flow rate.

15. A rotor shaft magnetically suspended within a housing and maintained in position axially by a control system responsive to disturbances of said axial position to apply restoring forces to the shaft including an axial thrust vibration damping arrangement comprising at least one radially extending thrust face fixed with respect to the rotor shaft and facing along the axis of the shaft, a gas supply arranged to feed gas to impinge upon said thrust face and flow in a radial direction along a face gap between said thrust face and the housing, said face gap including adjacent the upstream entrance thereto a gas flow restrictor extending between the housing and thrust face, whereby the area of the gap entrance is a function of the axial position of the thrust face and shaft with respect to the housing, and, downstream of said gas flow restrictor:

(a) chamber means, comprising at least one chamber, opening at a chamber neck into said face gap adjacent the thrust face and (b) exhaust passage means, comprising at least one passage having a cross-section greater than the maximum area of gap entrance at the gas flow restrictor, extending from the chamber means to downstream of the face gap, said gas supply being arranged to feed gas at such rate as to create a positive pressure within the chamber means to exert an axial thrust on the thrust face related to the neck area of the chamber means, said gap entrance being varied by axial vibrational reciprocation of the thrust face, induced by disturbances of the shaft, to create a variation in said positive pressure within the chamber means advanced in phase with respect to the variation of shaft position within a predetermined frequency range to effect a corresponding variation in axial thrust on said thrust face to effect damping of the shaft reciprocation.

* * * * *